Patented June 17, 1930

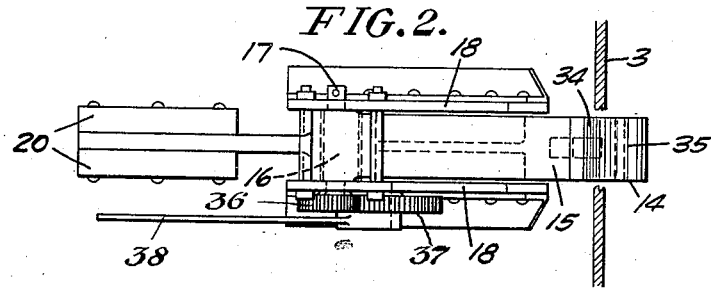
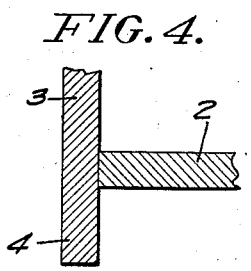
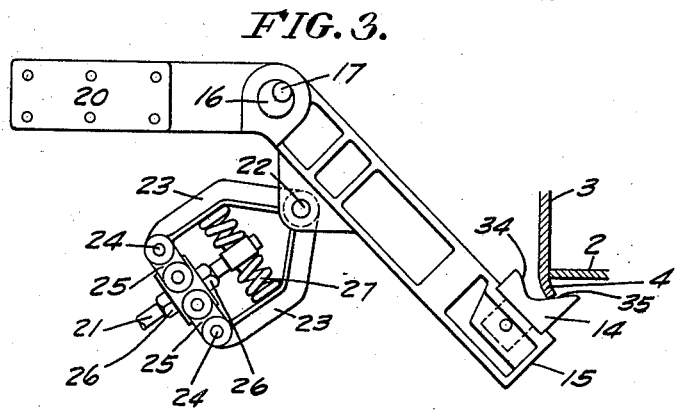
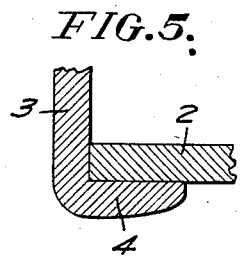
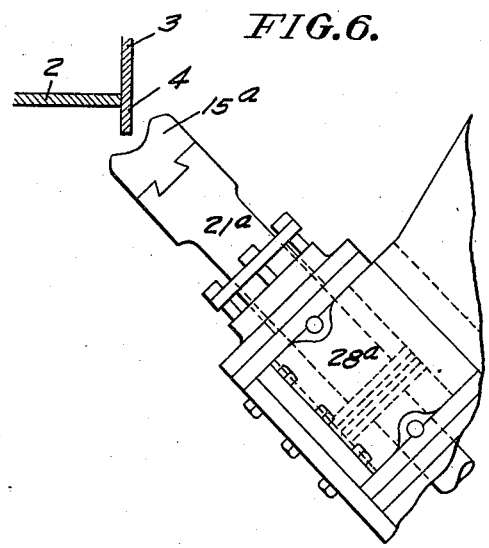

1,763,787

UNITED STATES PATENT OFFICE

PERCY E. HUNTER, OF PITTSBURGH, PENNSYLVANIA

FLANGING AND WELDING MACHINE

Application filed April 26, 1927. Serial No. 186,691.

My invention refers to improvements in welding apparatus, and particularly refers to means for welding the heads on annealing boxes, tanks, or the like.

Ordinarily, in such work, a head is clamped to the end of the box, heated and then hammered down with sledges along the edges and corners, to bring it into welded connection with the end of the box. In my invention I heat the associated blank members so clamped over a heating furnace, then move the box and the clamped-on head quickly over from the furnace into range of the welding machine, where the welding joint is effected by action of an upwardly acting hammer acting as a flanging or welding tool.

In the drawings, showing one preferred embodiment of the invention:

Fig. 2 is a partial plan view thereof showing the active member of the machine;

Fig. 3 is a detail view in elevation of the upwardly acting pivotally mounted hammer;

Figs. 4 and 5 are views of the joint construction before and after treatment;

Fig. 6 is a detail view showing a modified construction of welding hammer.

Figure 1:
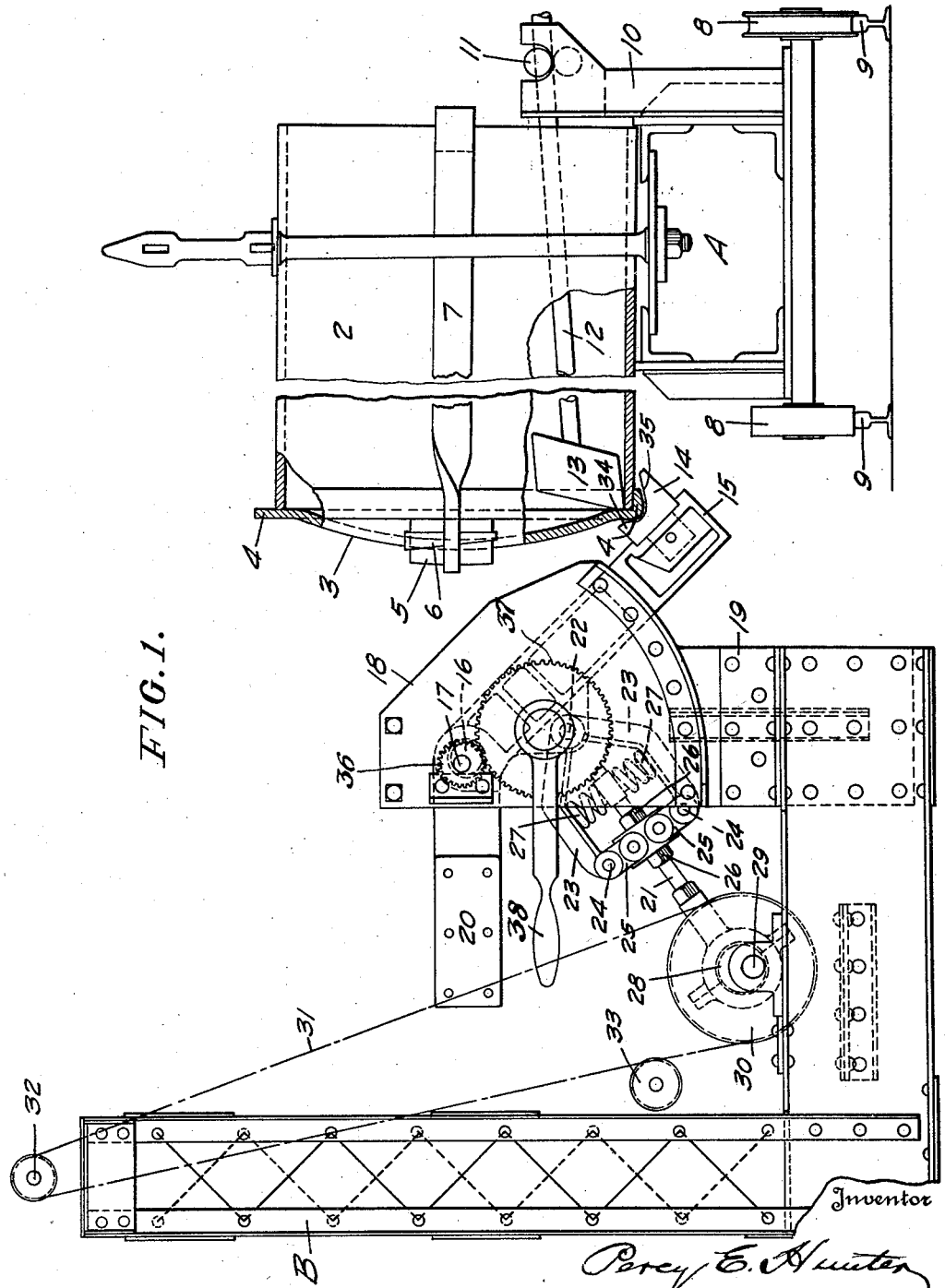
Fig. 1 is a view in elevation showing the machine in operative relation to an annealing box.

In the drawings, 2 represents the main body portion of a box, tank, etc., comprising the sides and ends of a previously formed blank of well known construction.

The body 2 is eventually connected with and covered by the top or end plate 3 of flat, dome or arched form as shown. The plate 3 has projecting side and end portions 4 which are bent or folded around the end walls of the body blank, and welded thereto by my improved machine.

Head 3 is temporarily clamped to body 4 by any suitable means, as a cross clamp 5 connected by wedges 6 at each side with the terminals of holding straps 7, engaging the opposite edge portions of the blank by their inwardly turned ends. As thus associated the body and cap are laid sidewise or endwise upon the supporting buggy or carriage A, the construction of which will be generally understood from the drawing, mounted by wheels 8 upon tracks 9, by which the carriage may be moved.

As shown the covered end of the blank extends laterally from one side of the carriage for the purpose of locating the parts to be welded or flanged along one corner portion over a suitable heating furnace in the same manner generally as shown in my prior application filed Apr. 2, 1923, Ser. No. 629,256.

At the other side the carriage is provided with supporting brackets 10 in the upper portion of which is laid a yoke 11 for supporting the handle 12 of a swedge block 13.

Such block is inserted in the manner shown, and is manipulated by the workman along the inner portion of the seam being welded as the operation progresses, providing a co-acting abutment for absorption of the shocks of the welding hammer.

The welding operation is effected by means of an upwardly acting hammer or block 14 carried in the outer end of a vertically reciprocating arm 15 which is pivoted around the enlarged eccentric hub 16 of the bearing shaft 17. Said shaft is mounted in the side frames 18 of a supporting post 19, located in operative proximity to the track 9 for registering relation with the blank, when it is run over the track by the carriage A.

Arm 15 is counterweighted, as at 20, for suitably balancing the arm and securing the momentum effect of hammering blows, under the action of vibrating pitmen 21.

Said pitman is pivotally connected with the under side of arm 15, as at 22, and the pitman itself is more or less resilient, for the absorption of shocks and providing for operation during bending over a flange to be bent or welded. Pitman 21 for such purpose is provided with a pair of arms 23 pivotally connected at 24, with middle links 25 which are pivotally mounted on the pitman shaft, with provision for adjustment thereon by nuts 26.

Cushion springs 27 are inserted between arms 23 for resiliency, and the inner end of the pitman is mounted around eccentric 28 of drive shaft 29. Said shaft is actuated by pulley 30 and belt 31 from a suitable motor-driven shaft 32 suitably mounted on a column or other convenient framework B, forming a portion of the welding unit. A tightening and loosening pulley 33 is used to tighten and loosen belt 31.

As thus arranged it will be seen that when shaft 29 is rotated a series of hammer blows will be imparted by the welding block 14. Block 14 as shown is removably mounted in the receiving saddle at the lower end of arm 15, and said arm is capable of adjustment by eccentric mounting 16, to adapt it to different stages of the work. For the purpose of adapting the die to the work at different positions, the contacting face of the head 14 is concave and rounded as shown at 34, and provided with a forwardly extended flat face 35.

Any suitable means may be utilized for adjusting the eccentric mounting of the hammer arm 15, as gears 36, 37, and an operating arm 38, as in Fig. 1.

In the preliminary swedging operation of the hammer the terminal flange 4 will be thrown partially around the corner of wall 2 by impact of the curved face 34. Thereafter upon continued reciprocation of the hammer the flange will be thrown upwardly around and against the end portion of the wall, with a thinning or tapering effect thereon, bringing the parts into close intimate contact and in a finally completely welded close and intimate relation. The rounded portion of the flange also receives a thickening or upsetting treatment by action of the die.

Due to the fact that the blank is quickly moved from the furnace over to the welding machine, occupying but a few seconds of time, the metal is in a soft, malleable, highly heated condition and the operation is rapidly effected, without loss of time.

The advantages of the invention reside in the rapidity of operation, while the manipulation of the welding hammer upwardly from below, during such short time, allows for very rapid welding with avoidance of oxidation so that very little scale can form, with a greatly improved quality of weld.

Another advantage is that any scale that is formed becomes quickly loosened and falls downwardly clear of the welding surfaces, instead of being hammered into the weld.

A further advantage is that an excellent weld may be secured at a lower heat than necessary where more time is required to swing or adjust the box or article being welded, to adapt it to other usual methods or machines.

The speed of operation, the weight of hammer, adjustment of surface contact of the hammer itself, and other features of detail construction are within the province of the builder or mechanic, and may be changed or varied to adapt the invention to the work in view.

For instance, as indicated in Fig. 6, a reciprocating hammer 15$^a$ may be utilized in connection with the reciprocating piston 21$^a$ of a hydraulic or pneumatic cylinder 28$^a$ of any suitable construction, properly located at a suitable angle for proper attack against the flange 4, as in Fig. 6.

What I claim is:

1. A device for welding to the edges of a box a head having a flange extending beyond the box at right angles thereto consisting of an upwardly acting hammer having a face adapted to strike the edge of the extending flange to slightly upset it at the region of the joint and provided with a concaved surface adapted to press the flange into welded engagement with the edge of the box.

2. A device for welding to the edges of a box a head having a flange extending beyond the box at right angles thereto consisting of an upwardly acting hammer having a face adapted to strike the edge of the extending flange to slightly upset it at the region of the joint and provided with a concaved surface adapted to press the flange into welded engagement with the edge of the box, and actuating means for imparting alternating upward and outward movement thereto.

3. A device for welding to the edges of a box a head having a flange extending beyond the box at right angles thereto consisting of an upwardly acting hammer having a face adapted to strike the edge of the extending flange to slightly upset it at the region of the joint and provided with a concaved surface adapted to press the flange into welded engagement with the edge of the box, actuating means for imparting alternating upward and outward movement to the hammer, and means for adjusting the surface of the hammer with relation to the flange.

In testimony whereof I hereunto affix my signature.

PERCY E. HUNTER.